Patented Nov. 20, 1934

1,981,605

UNITED STATES PATENT OFFICE 1,981,605

REFINING OF COTTON SEED OIL

Max Schellmann, Mannheim, Germany, assignor to I. G. Farbenindustrie Aktiengesellschaft, Frankfort-on-the-Main, Germany No Drawing. Application August 10, 1933, Serial No. 684,562. In Germany August 11, 1932

13 Claims. (Cl. 87—12)

The present invention relates to the refining of cotton seed oil.

It has already been proposed to treat fatty oils and fats with aqueous solutions of salts, such as Glauber's salt, calcium chloride, borates and the like at room or slightly elevated temperatures for the purpose of removing the mucilaginous substances contained therein. A complete removal of the mucilaginous substances, dyestuffs and resins by this method is only possible in a very few cases. Especially in the case of cotton seed oil which has been treated in this manner and subjected to a distillation for the purpose of deacidification it is impossible to render the colour of the oil lighter by subsequent refining with alkalies. In the British Specification No. 341,390 a process is described for the separation of impurities from fatty oils and fats which consists in emulsifying the said materials with a small percentage of acid or neutral liquids which are immiscible with the oils and fats and chemically inert to the impurities, the films formed being then mechanically separated. By this process a certain effect is obtained but the purification is not entirely satisfactory.

I have now found that crude cotton seed oil can be freed from mucilaginous substances and that a lasting decolourizing effect can be attained in a manner which is readily carried out industrially by heating said oil together with a small quantity of an anhydrous, solid ester from boric acid and an aliphatic polyhydric alcohol, the precipitate formed being then removed in any known and suitable manner. Esters of boric acid with aliphatic polyhydric alcohols containing 2 or 3 carbon atoms, that is glycerine or ethylene glycol, in which the hydroxyl groups may be wholly or partially esterified, are particularly suitable for the purpose of the present invention.

The quantity of boric ester is generally between about 0.5 and about 5 per cent by weight of the oil, and usually about 1 per cent. The treatment may be carried out at atmospheric pressure or, preferably, in vacuo, especially at a pressure between about 15 and about 50 millimetres mercury gauge, for protecting the oil from decomposition and is advantageously effected by adding the solid boric ester to the oil before or during the heating thereof, the oil being simultaneously thoroughly stirred. Generally speaking, temperatures between about 160° and about 280° C. are employed. By the treatment according to the present invention, a complete precipitation of the mucilages, resins, colouring matter and other impurities from the oil is effected. The mucilaginous substances separate in a solid granular form and are removed by sedimentation or filtration or any other suitable mechanical method, such as centrifuging, before the further treatment. They may, however, also be allowed to remain in the oil and removed later on, during the subsequent refining with caustic alkalies or at any other stage of the further treatment. The oil treated in the said manner has a dark colour before the removal of the finely divided precipitate but, after removal of the precipitate, a clear, pale oil is obtained which is not coloured again by any subsequent heat-treatment, such as with caustic alkalies, for example caustic soda or potash.

It is preferable to combine the removal of the mucilaginous substances and of colouring matter with the deacidification of the oil by distillation, preferably in the presence of wet or dry steam or of mists or vapours of other inert volatile liquids, in a subsequent or, more simply, in a simultaneous operation, whereby a separation of the fatty acids by distillation as for example according to the Patents Nos. 1,622,126 or 1,871,051 may be carried out. In this case the oil is subjected to a treatment in vacuo while leading in gases or vapours containing finely divided inert, volatile liquids or such a liquid is introduced into the heated oil by means of a nozzle. In this case, the solid boric ester is added to the oil from the start or is added during the course of the distillation. The oil may also be partially freed from mucilaginous substances, for example by emulsifying with water or dilute solutions of electrolytes, such as phosphoric acid or sodium chloride, and partially bleached according to known methods before it is treated with the boric ester or are deacidified in the presence of such an ester by distillation, as for example according to the aforesaid patents. The oil is made paler by the said previous removal of mucilaginous substances and bleaching but in a subsequent deacidification by distillation without addition of said boric ester, a deeper colouration would be attained and the oil would then be bleached with great difficulty.

The following examples will further illustrate the nature of this invention but the invention is not restricted to these examples.

*Example 1*

14 parts of anhydrous boric acid are heated together with 13 parts of 94 per cent commercial glycerine to 150° C. for about 3 hours, while stirring. The reaction product thereby becomes more viscous and finally shows a tendency of becoming solid. The reaction product is then allowed to cool, comminuted and ground in a ball mill to a fine dust.

Crude cotton oil having an acid value of 8.7 is mixed with 1 per cent of its weight of the product thus obtained and subjected at 245° C. and at a pressure of 20 millimetres mercury gauge to a deacidification according to the process described in the aforesaid Patent No. 1,622,126, whereby the free fatty acids are removed. The oil treated in this manner has an acid value of 0.7 and shows, after filtration, in the 1"-vessel of the Lovibond tintometer, the following colour values: yellow 20, red 4.1. By an alkaline refining, for example with an aqueous about 5 per cent caustic soda solution, and a bleaching process with, say, 3 per cent by weight of the oil, of a commercial bleaching earth, a very clear oil is obtained.

*Example 2*

Crude cotton oil having an acid value of 8.7 is mixed with 1 per cent of its weight of an ester obtainable from 2 parts of anhydrous boric acid and 3 parts of 94 per cent commercial glycerine according to the process described in Example 1 and subjected at 245° C. and at a pressure of 20 millimetres mercury gauge to a refining treatment according to the process described in the aforesaid Patent No. 1,871,051. The resulting oil has an acid value of 0.8 and shows, after filtration, in the 1"-vessel of the Lovibond tintometer the following colour values: yellow 1.5, red 2.65.

What I claim is:—

1. A process for removing mucilaginous substances, colouring matter and other impurities from crude cotton seed oil, which comprises heating said oil together with a small quantity of an anhydrous, solid ester from boric acid and an aliphatic polyhydric alcohol, the precipitated impurities being then mechanically separated.

2. A process for removing mucilaginous substances, colouring matter and other impurities from crude cotton seed oil, which comprises heating said oil together with a small quantity of an anhydrous, solid ester from boric acid and an aliphatic polyhydric alcohol at a temperature between about 160° and about 280° C., the precipitated impurities being then mechanically separated.

3. A process for removing mucilaginous substances, colouring matter and other impurities from crude cotton seed oil, which comprises heating said oil together with from about 0.5 and about 5 per cent, by weight, of an anhydrous solid ester from boric acid and an aliphatic polyhydric alcohol, the precipitated impurities being then mechanically separated.

4. A process for removing mucilaginous substances, colouring matter and other impurities from crude cotton seed oil, which comprises heating said oil together with a small quantity of an anhydrous, solid ester from boric acid and an aliphatic polyhydric alcohol at a pressure up to atmospheric pressure, the precipitated impurities being then mechanically separated.

5. A process for removing mucilaginous substances, colouring matter and other impurities from crude cotton seed oil, which comprises heating said oil together with a small quantity of an anhydrous, solid ester from boric acid and an aliphatic polyhydric alcohol at a temperature between about 160° and about 280° C. and at a pressure up to atmospheric pressure, the precipitated impurities being then mechanically separated.

6. A process for removing mucilaginous substances, colouring matter and other impurities from crude cotton seed oil, which comprises heating said oil together with from about 0.5 and about 5 per cent, by weight, of an anhydrous, solid ester from boric acid and an aliphatic polyhydric alcohol containing 2 or 3 carbon atoms at a temperature between about 160° and about 280° C. and at a pressure up to atmospheric pressure, the precipitated impurities being then mechanically separated.

7. A process for removing mucilaginous substances, colouring matter and other impurities from crude cotton seed oil, which comprises heating said oil together with from about 0.5 and about 5 per cent, by weight, of an anhydrous, solid ester from boric acid and glycerine at a temperature between about 160° and about 280° C. and at a pressure up to atmospheric pressure, the precipitated impurities being then mechanically separated.

8. A process for removing mucilaginous substances, colouring matter and other impurities from crude cotton seed oil, which comprises heating said oil together with a small quantity of an anhydrous, solid ester from boric acid and an aliphatic polyhydric alcohol containing 2 or 3 carbon atoms, the said oil being simultaneously subjected to a deacidification treatment, the precipitated impurities being then mechanically separated.

9. A process for removing mucilaginous substances, colouring matter and other impurities from crude cotton seed oil, which comprises heating said oil together with a small quantity of an anhydrous, solid ester from boric acid and an aliphatic polyhydric alcohol containing 2 or 3 carbon atoms, the oil being simultaneously subjected to a deacidification treatment in vacuo, the precipitated impurities being then mechanically separated.

10. A process for removing mucilaginous substances, colouring matter and other impurities from crude cotton seed oil, which comprises heating said oil together with from about 0.5 and about 5 per cent, by weight, of an anhydrous, solid ester from boric acid and glycerine at a temperature between about 160° and about 280° C. and at a pressure up to atmospheric pressure, the said oil being simultaneously subjected to a deacidification treatment in vacuo, the precipitated impurities being then mechanically separated.

11. A process for removing mucilaginous substances, colouring matter and other impurities from crude cotton seed oil, which comprises heating said oil together with from about 0.5 and about 5 per cent, by weight, of an anhydrous solid ester from boric acid and glycerine at a temperature between about 160° and about 280° C. and at a pressure below atmospheric pressure, the free acids contained in the oil being simultaneously removed by distillation, the precipitated impurities being then mechanically separated.

12. A process for removing mucilaginous substances, colouring matter and other impurities from crude cotton seed oil, which comprises heating said oil together with from about 0.5 and about 5 per cent, by weight, of an anhydrous solid ester from boric acid and ethylene glycol at a temperature between about 160° and about 280° C. and at a pressure up to atmospheric pressure, the free acids contained in the oil being simultaneously removed by distillation, the precipitated impurities being then mechanically separated.

13. A process for removing mucilaginous substances, colouring matter and other impurities from crude cotton seed oil, which comprises heating said oil together with from about 0.5 and about 5 per cent, by weight, of an anhydrous solid ester from boric acid and glycerine at a temperature between about 160° and 280° C. and at a pressure below atmospheric pressure, the free acids contained in the oil being simultaneously removed by distillation in the presence of a volatile liquid inert to said oil, the precipitated impurities being then mechanically separated.

MAX SCHELLMANN.